March 8, 1966        C. S. WHITE        3,239,589
METHOD OF FORMING A LOW FRICTION PISTON IN A CYLINDER
Original Filed May 9, 1956
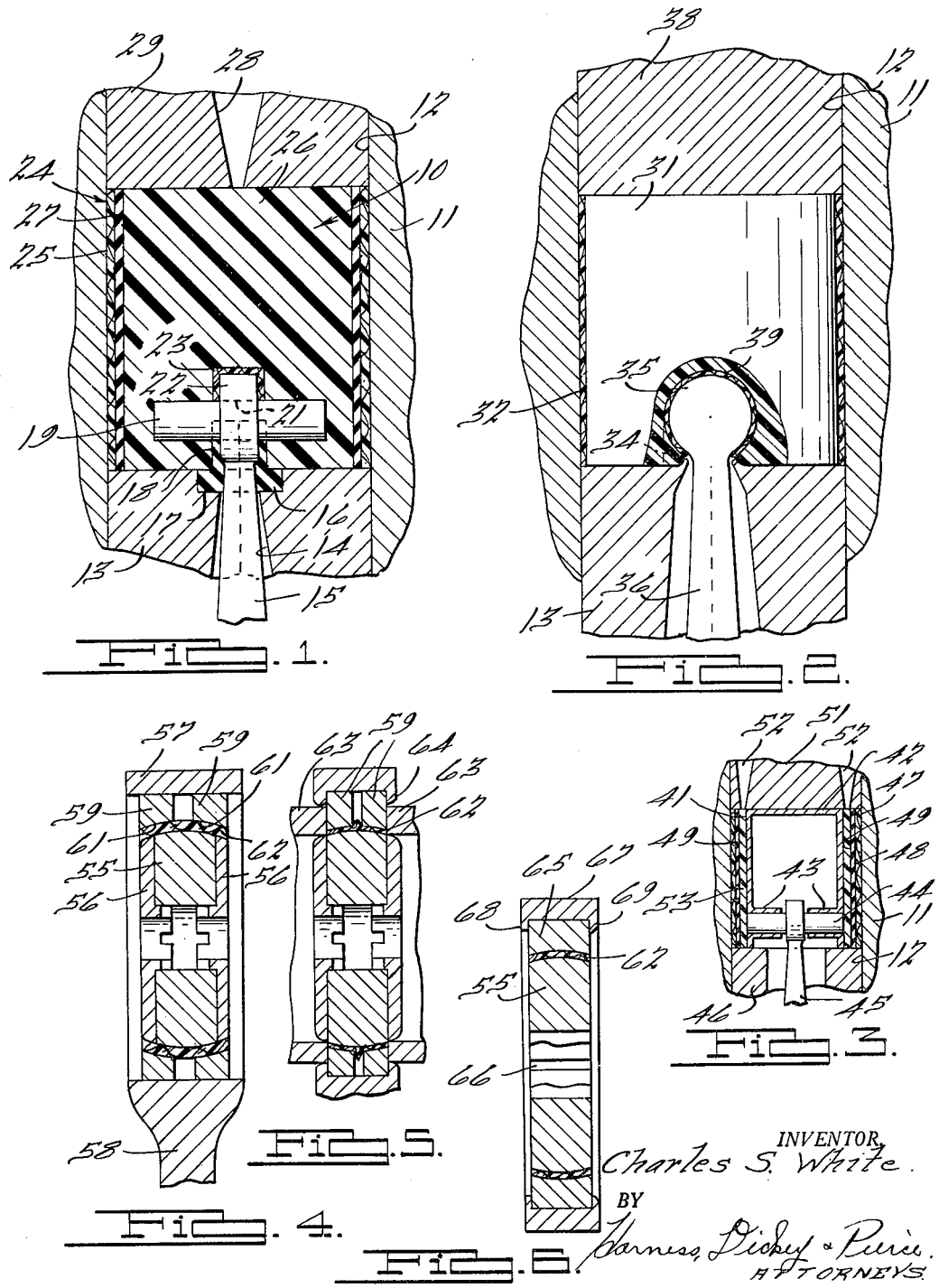
INVENTOR
Charles S. White
BY
Harness, Dickey & Pierce
ATTORNEYS United States Patent Office 3,239,589
Patented Mar. 8, 1966

3,239,589
METHOD OF FORMING A LOW FRICTION
PISTON IN A CYLINDER
Charles S. White, Rte. 3, Box 454–H, Palmdale, Calif.
Continuation of application Ser. No. 583,680, May 9,
1956. This application Oct. 18, 1961, Ser. No.
147,133
13 Claims. (Cl. 264—242)

This invention relates to methods of forming low friction members and particularly to a method of forming a low friction resin member which has pressure engagement with a mating member, and is a continuation of Charles S. White application Serial No. 583,680, filed May 9, 1956, for Method of Forming a Low Friction Piston in a Clyinder.

In view of the difficulty of machining cylindrical bores, spherical surfaces and sockets to maintain accurate diameter when producing finished mated surfaces, many expedients were employed in the past to provide mated members having accurate dimension and perfect fit between the mating operating surfaces. The connection between ball and socket joints of rod ends was always difficult to construct not only in the assembly of the ball within the socket but also in machining surfaces which were highly polished and which were to be of exact mating diameters. In pistons, for example, reliance was had on rings which were carried in grooves in the cylinder wall to produce an acceptable seal between the wall and the surface of a cylinder.

The present invention contemplates the use of a low friction resin material on the peripheral wall of a piston which is expanded into engagement with the wall of a cylinder bore throughout the length of the piston. This may be accomplished by forming a blank of formable resin material having on the peripheral face a layer of the low friction resin material. The resin material is heated and pressure is applied at the opposite ends to expand the blank and force the low friction material into desired pressure relationship with the cylinder bore in which the piston is to operate.

A layer of elastic material may be provided between the layer of low friction material and the body portion of the piston to permit the low friction material to move relative to the body portion to take care of any discrepancy in the diameter of the cylinder bore throughout the working length thereof. Similarly, a sleeve of the low friction material separately or secured in engagement with a layer of resilient material may be placed within the cylinder bore and a material under pressure forced into the central area thereof. In this manner the inner piston body is formed which may be molded about a wrist pin which joins a connecting rod in permanent relationship therewith. It is possible to mix sufficient low friction material, such as "nylon" and/or "Teflon," with the phenolic base that when the material is delivered under pressure a satisfactory low friction engagement will be provided between the cylinder surface and the surface of the delivered material which is in direct engagement therewith. The low friction material may be secured by bonding or by physical retention to the mass forming the body of the piston.

A further arrangement embodies the use of a stamping or casting having bores for receiving the wrist pin and having a diameter less than the interior diameter of the layer of low friction material alone or when backed by a layer of resilient material. The moldable material is injected directly between the inner hollow body and the layer or layers of material to provide an engagement under predetermined pressure between the low friction material and the surface of the cylinder bore.

In rod end applications, the low friction material in sleeve form is placed between the central ball and a split raceway. When the raceway is split by a plane perpendicular to the central axis, the two washerlike parts are spaced to provide room to receive the material. The spaced raceway parts are moved toward each other with a predetermined pressure for compacting the material between the ball surface and the surface of the raceways. The ball and raceways may first be heated or heat may be applied to the assembly to form the resin material to the ball and preferably bond the sleeve material to the surface of the raceways. This assembly is similar to that of the piston arrangement as only the ball, like the bore surface, need be polished. The exact diameter of the ball or bore surface need not be maintained since the forming of the piston and the sleeve material will take care of any difference in dimensions while providing engagement between the polished surface and the surface of the low friction resin material under a predetermined pressure. It is within the purview of the invention to split the raceway on the diameter and press the raceways toward each other after the sleeve of low friction resin material has been applied to the ball to compress the material when heated to a formable stage, with a predetermined pressure. After cooling, the material is bonded to the raceway, and a pressure relationship is maintained when the raceway and assembly are press-fitted in a ring of the rod end. With this arrangement, a tight bearing surface is assured having very low friction characteristics which permit use without any play or appreciable wear.

Accordingly, the main objects of the invention are: to provide a low friction layer of resin material which is compacted against a polished surface with which it operates; to expand a low friction resin sleeve against a polished surface with which it is to operate by pressure on a heated formable body member or by pressure on a material which is forced into the cavity within the sleeve of low friction material; to provide a layer of resilient material between the body portion of a movable element and a low friction resin material to permit the lateral movement of the low friction material when in pressure engagement with a member; to provide a hollow core body of a piston of less diameter than the diameter of a layer of low friction resin material of the diameter of the cylinder bore to provide a space therebetween which is filled by material forced under pressure into the space; to form a ball and socket rod end by placing a sleeve of low friction resin material between the ball and the socket which is split into two like parts and moved toward each other to compress the material of the sleeve between the surface of the socket and ball, to the former of which the material is preferably bonded, and, in general, to provide low friction resin surfaces to one of two mated movable parts which is simple in construction and economical of manufacture.

Other objects and features of novelty of the invention will be specifically pointed out or will become apparent when referring for a better understanding of the invention to the following description taken in conjunction with the accompanying drawing, wherein:

FIGURE 1 is a sectional view of a piston and cylinder shown in operating relation to each other, and the method by which the piston is constructed;

FIG. 2 is a view of structure, similarly illustrated in FIG. 1, showing another form of the invention;

FIG. 3 is a reduced view of structure, similarly illustrated in FIG. 1, showing a still further form which the invention may assume;

FIG. 4 is a sectional view of a rod end showing the elements thereof assembled together prior to the application of heat and pressure to position the elements in final form;

FIG. 5 is a view of the structure illustrated in FIG. 4 after the heat and pressure have positioned the elements in final form, and FIG. 6 is a view of structure, similarly illustrated in FIG. 5, showing another form of the invention.

In FIG. 1, a piston 10, made in accordance with the present invention, is constructed to operate wihtin a cylinder 11 which may be a hydraulic ram, pump, compressor, engine or the like. The inner wall 12 of the cylinder is made uniform throughout its length and is honed or otherwise machined to provide a finished surface. The exact diameter of the cylinders need not be maintained since a few thousand plus or minus will be automatically taken care of by the piston when formed within the cylinder. A final machining operation lengthwise of the bore 12 will produce longitudinal uniformity although the diameters of different bores may vary.

The piston 10 is formed within the cylinder by closing the bottom with a longitudinally split cylindrical plug 13 having an aperture 14 in the center for receiving a piston or connecting rod 15. A recess 16 at the top of the plug 13 has a sealing plug 17 which may be of plastic, rubber or similar material to seal the piston or connecting rod 15. The plug 17 extends upwardly at 18 to provide clearance to permit the connecting rod 15 to swing during the piston operation. When the connecting rod 15 is employed rather than the fixed piston rod, a pin 19 is placed within a head 22 of the connecting rod 15. The outer surface of the head 22 is preferably enclosed by a low friction material 23 which may be nylon, Orlon or other known resin material or which preferably is a fluorocarbon resin in film or cloth form which is bonded to the head 22.

A sleeve 24 having an outer surface 25 of fluorocarbon resin is placed against the surface of the bore which had bonding characteristics with a resin material 26 which forms the main body of the piston. Such bonding characteristics may be provided by embedding cords of bondable material such as cotton, rayon, "nylon," "Orlon," glass and the like on the inner surface of the sleeve 24, as disclosed in reissue Patent No. 24,765 granted to Charles S. White on January 12, 1960, for Low Friction Fabric Material. In some instances the fluorocarbon resin material is bonded to an inner sleeve 27 of resilient materials such as rubber, resin and the like. The resin material 26, such as phenol, vinyl and similar types known to be suitable, are forced through an aperture 28 in the center of a cylindrical plug 29 which is positioned in the bore 12 opposite to the end in which the plug 13 is positioned. The material 26 is forced through the aperture 28 under pressure to fill the entire cavity of the inner sleeve 27 about the pin 19 and the head 22. Upon the setting of the material the split plug 13, the plug 29 and the split sealing element 17 are removed from the bore and a positive seal is maintained between the low friction fluorocarbon resin material 25 and the wall of the cylinder bore 12 under a pressure controlled by the amount of force exerted in filling the cavity by the material 26. When the inner sleeve 27 of resilient material is employed, the outer layer 25 of the low friction material may move laterally to take care of any discrepancies in the finish of the bore 12. The fluorocarbon resin material employed in the sleeve 24 when in woven form is illustrated, described and claimed in the above mentioned reissue patent of Charles S. White, and when in film form is constructed as disclosed in the Chales S. White application, Serial No. 583,657, filed May 9, 1956, now abandoned, for Metal Bearing Having a Low Friction Surface, and when bonded to rubber with a barrier film therebetween is disclosed in Charles S. White patent No. 2,907,612 issued October 5, 1959, for Barrier and Bonding Material for Low Friction Surface.

In FIG. 2 another form of the invention is illustrated that wherein a piston body 31 is formed outside the bore 12 of moldable resin material such as a phenolic resin which is cured to the B stage so that it may be heated and reformed into C stage, that is to say, into final set condition. The outer surface of the material of the piston body 31 is covered by a sleeve of low friction resin material which may be of any low friction resin type but which preferably is a fluorocarbon resin such as referred to in the above mentioned abandoned application and patents. Such material 32 may be applied directly to the surface of the piston body 31 or may have a layer of resilient resin or rubber material applied between the body and the layer of low friction material. The lower central portion of the piston body is provided with a cavity as indicated by a dotted line 34 in which a ball end 35 of a connecting rod 36 is disposed. A plug 13, similar to that employed with the structure of FIG. 1, is placed about the connecting rod 36, and the piston body 31, the plugs 13 and connecting rod 36 are inserted in the bore 12. The opposite end of the bore has an ram 38 inserted therein for applying a pressure to the piston against the plug 13 at the bottom thereof. The entire assembly may be heated or the plug 13, ram 38 and cylinder 11 may be heated before assembly to a temperature above that required to heat the material of the body 31 of the piston when placed in the bore 12 so that it may be molded under pressure to final form. The application of the pressure to the opposite ends of the piston when heated to the proper temperature causes the material to expand laterally and force the low friction resin material 32 against the inner surface of the bore 12. The material 32 will be forced about the ball head 35 of the connecting rod 36 as well as a layer 39 of the low friction resin material, provided within the cavity 34, to securely anchor the ball head to the piston body 31. A predetermined pressure relationship is provided between the low friction material 32 and the wall of the bore and the material 39 and the surface of the head 35. The removal of the plug 13 and ram 38 completes the assembly and assurance is had that a perfect seal of extremely low friction characteristics is provided between the piston and the cylinder wall.

A further extension of the invention is illustrated in FIG. 3 wherein a piston 41 is constructed of a central stamping or casting 42 of metal, resin or suitable material having sleeved apertures 43 receiving a wrist pin 44 which secures a connecting rod 45 thereto. A hollow cylindrical plug 46 is inserted within the bore 12 of the cylinder 11. A sleeve of low friction resin material 47 alone or backed by a resilient sleeve 48 is placed against the wall of the cylinder bore 12 providing a space 49 between the cylindrical wall of the element 42 and the inner face of the sleeve 47 or 48. A plug 51 is inserted in the top end of the cylinder bore 12 having apertures 52 therein in communication with the space 49. A resin material 53, similar to the material 26 of the sleeve 24, may then be forced into the space 49. A predetermined pressure is applied to the outer surface of the low friction material 47 to produce a firm positive seal with the engaged surface of the bore 12 which has exceptionally low friction characteristics since the material 47 is preferably of a fluorocarbon resin material such as Teflon which requires no lubrication.

Ball and socket rod ends illustrated in FIGS. 4 and 5 are constructed in a similar manner. A polished segment of a ball 55 has end plates 56 applied thereto and placed within a head 57 provided at one end with a rod 58. A pair of washer-like raceway or socket elements 59 having arcuate surfaces 61 roughly formed therein are placed within the head against a sleeve of low friction resin material 62. Pressure is applied to both sides of the washerlike element 59 by one or both sleeve elements 63 to force them toward each other and provide a pressure engagement between low friction resin material 62 and the polished surface of the ball. The washerlike element 59 may be made of metal or of the moldable plastic material which forms under heat and pressure to the desired shape. The low friction material is preferably bonded to the arcuate surfaces 61 by the use of "Cycle Weld" sold by Chrysler or "Plastilok" by Goodrich by the applied heat. When the low friction material is formed when heated, upon cooling a bearing contact with the polished arcuate surface of ball 55 is provided under a predetermined pressure. Flanges 64 are formed on both sides of the head 57 by coining operations for retaining the two washers 59 in adjacent relation to each other. It is to be understood that pressure on the plastic material of the washerlike elements 59 may force them into intimate engagement with each other and with the low friction bearing material with which it bonds. Such plastic material may be similar to the material 26 of FIG. 1 which is forced through an aperture in the head 57 into the space between the ends of the sleeves 63 to bond to the low friction resin material 62 while forcing it into engagement with the polished surface of ball 55 under predetermined pressure.

The low friction material 25, 32, 47 and 62 may be a film of fluorocarbon such as "Teflon" secured to a backing material which is bonded to the surface of the elements 59 or may be the Teflon threads woven into a cloth having bondable cords therein or take any other form as clearly disclosed and described in the above mentioned abandoned application and patents.

A similar arrangement is illustrated in FIG. 6 wherein the encompassing element 65 of the ball 55 is split on a diameter as at 66 with the two halves forced toward each other against the sleeve of low friction resin material 62. When reference is made herein to the sleeve of the material, it is understood that a piece of material may be employed having the ends in abutting relation to each other as well as a sleeve which is woven or built up as described in the herein set forth abandoned application and patents. After pressure is applied between the element 65 the entire assembly is forced within the head 67, one side of which is provided with a flange 68, the other side of which has a flange 69 formed thereon by coining the inner edge of the ring. In a similar manner the element 65 may be made of metal or plastic material such as the material 26 so that it may be forced under heat into exact engagement with the low friction resin material 62 with which it is bonded. It is also within the purview of the invention to close the sides of the ball 55 and the area within the flanges 68 and 69 and force the plastic material 26 into the area within the head 67 to form the element 65. In any of the constructions, low friction surfaces are provided against polished surfaces of a mating element by low friction resin materials, preferably of the fluorocarbon types, such as "Teflon," "Kel-F," "Fluorothene," and the like, described in the above mentioned abandoned application and patents. The low friction materials may be backed by a resilient material, such as a layer of rubber to provide flexibility under pressure to the engaged surfaces.

While the invention is herein illustrated is being applied to pistons and rod ends, it is to be understood that many other similar applications can be made by the same structures and methods employing pressure to produce engagement between the low friction resin material and the polished surface of the element on which it is to operate. For example, if the two half cylindrical elements 65 of FIG. 6 contained an internal thread, such thread could be used to mold a thread on a stud, bolt or the like which may have a thread of smaller diameter thereon. The low friction material will fill the space between the threads of the parts when a proper amount is employed. When the stud has a holding relation with the material after it is cured, a complete thread may be made in this manner. Further, when the term "fluorocarbon resin" is recited herein and in the claims, it is intended to include all of the polymerized materials which are obtained by the polymerization of the fluorocarbons including perfluorocarbons and partially substituted fluorocarbons, e.g., the chloro, bromo, or nitro-substituted fluorocarbons.

What is claimed is:

1. The method of forming a piston in situ within a cylinder of the type in which the piston reciprocates within the cylinder and the cylinder defines an enclosed chamber on at least one side of said piston and has means thereon for introducing fluid into said chamber which is pressurized while in the chamber which includes the steps of: locating a piston rod within the cylinder, placing a sleeve of low friction material against the wall of the cylinder, and forcing a thermosetting plastic resin in the area of the sleeve and rod and hardening said resin while under a predetermined pressure whereby said resin is formed into the piston.

2. The method as recited in claim 1 wherein said sleeve of low friction material comprises polytetrafluoroethylene fibers.

3. The method of froming a piston in situ within a cylinder of the type in which the piston reciprocates within the cylinder and the cylinder defines an enclosed chamber on at least one side of said piston and has means thereon for introducing fluid into said chamber which is pressurized while in the chamber which includes the steps of: locating a piston rod within the cylinder, placing a sleeve of low friction material against the wall of the cylinder, forcing a thermosetting plastic resin in the area of the sleeve and rod and hardening said resin while under a predetermined pressure, and applying heat to the resin which is formed into the piston under pressure about the rod and against the sleeve of low friction material to cause the sleeve to contact the cylindrical wall with a predetermined pressure.

4. The method of forming a piston in situ within a cylinder of the type in which the piston reciprocates within the cylinder and the cylinder defines an enclosed chamber on at least one side of said piston and has means thereon for introducing fluid into said chamber which is pressurized while in the chamber which includes the steps of: forming the body of the piston from a hollow element, locating a piston rod within the body, securing a wrist pin for the rod to the body, positioning the body within the cylinder, providing a layer of low friction material against the wall of the cylinder in spaced relation to the body, and filling the space with a resin material which is bonded to said layer and which accurately shapes the layer to mate with the cylinder in which the piston operates.

5. The method of forming a piston in situ within a cylinder of the type in which the piston reciprocates within the cylinder and the cylinder defines an enclosed chamber on at least one side of said piston and has means thereon for introducing fluid into said chamber which is pressurized while in the chamber which includes the steps of: finishing the bore of the cylinder to have a smooth surface, filling at least a portion of the length of said cylinder with a material having low friction characteristics at least at the surface, hardening said material while under pressure to form the piston, and maintaining said piston within said cylinder for retaining the sealed relationship when operating therein.

6. The method of forming a piston and cylinder combination as recited in claim 5 wherein said material is heated to have it conform precisely to the cylinder wall and to be hardened thereafter.

7. The method of forming a piston in situ within a cylinder of the type in which the piston reciprocates within the cylinder and the cylinder defines an enclosed chamber on at least one side of said piston and has means thereon for introducing fluid into said chamber which is pressurized while in the chamber which includes the steps of: finishing the bore of the cylinder to have a smooth surface, applying a sleeve of low friction material to the surface of said bore, and filling the area within the sleeve with a hardenable material to force the sleeve into intimate contact with the finished surface of the bore and hardening said material to form the piston.

8. The method of forming a piston as recited in claim 7 wherein one end of the piston is provided with means by which it is reciprocated within the cylinder.

9. The method of forming a piston as recited in claim 7 wherein the central part of the piston is filled with a core so as to reduce the amount of material required to form the piston.

10. The method as recited in claim 7 wherein said sleeve of low friction material comprises polytetrafluoroethylene fibers.

11. A method for forming a piston in situ within a cylinder of the type in which the piston reciprocates within the cylinder and the cylinder defines an enclosed chamber on at least one side of said piston and has means thereon for introducing fluid into said chamber which is pressurized while in the chamber which includes the steps of filling an axial portion of the bore of the cylinder with a material having low friction characteristics at least at the surface thereof in contact with said bore and hardening said material while under pressure whereby said material is formed into a piston in sealed slidable relationship with said cylinder.

12. The method of forming a piston in situ within a cylinder of the type in which the piston reciprocates within the cylinder and the cylinder defines an enclosed chamber on at least one side of the piston and has means thereon for introducing fluid into said chamber which is pressurized while in the chamber, which includes the steps of, applying a sleeve having low friction fibrous material on the outer surface thereof to an axial portion of the bore of the cylinder, engaging the inner surface of said sleeve with a hardenable material, and hardening said hardenable material while under pressure to force said sleeve against said bore whereby said hardenable material is formed into the piston with said sleeve in sealed slidable relationship with the bore of said cylinder.

13. The method as recited in claim 12 including positioning a layer of resilient material between said sleeve and said hardenable material before said hardenable material is hardened.

References Cited by the Examiner

UNITED STATES PATENTS

| | | | |
|---|---|---|---|
| 1,392,173 | 9/1921 | Kempton | 308—238 |
| 2,665,179 | 7/1950 | Salvatora | 92—249 |
| 2,954,992 | 10/1950 | Baker | 264—242 |

ROBERT F. WHITE, *Primary Examiner.*

WILLIAM STEPHENSON, *Examiner.*